No. 726,863. PATENTED MAY 5, 1903.
A. L. CLARK.
MEANS FOR OPERATING ROLLER AWNINGS.
APPLICATION FILED OCT. 14, 1901.
NO MODEL.
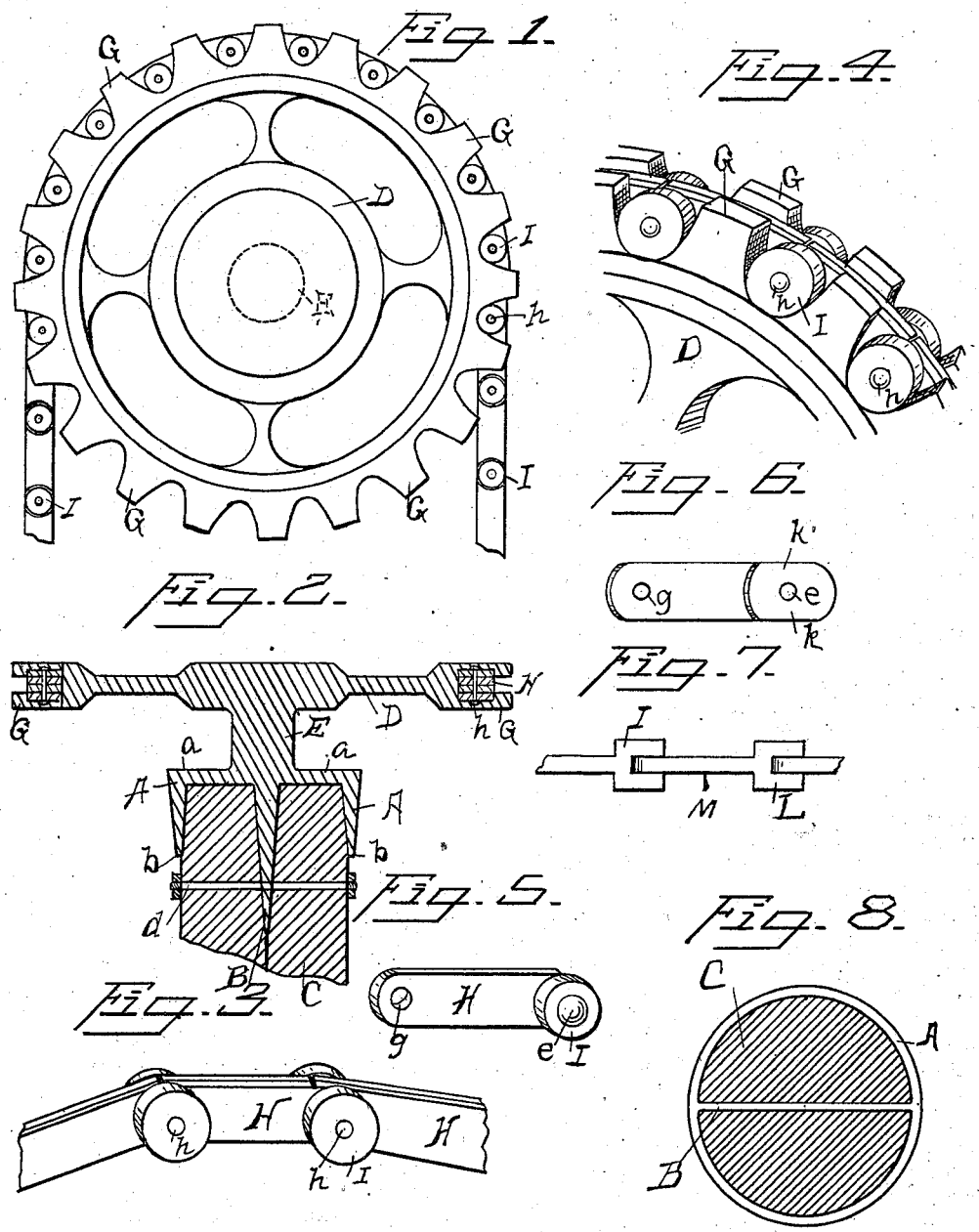

No. 726,863. Patented May 5, 1903.

UNITED STATES PATENT OFFICE.

ALFRED L. CLARK, OF DUBUQUE, IOWA, ASSIGNOR TO MAY M. CLARK, OF DUBUQUE, IOWA.

MEANS FOR OPERATING ROLLER-AWNINGS.

SPECIFICATION forming part of Letters Patent No. 726,863, dated May 5, 1903.

Application filed October 14, 1901. Serial No. 78,522. (No model.)

*To all whom it may concern:*

Be it known that I, ALFRED L. CLARK, a citizen of the United States, residing in the city and county of Dubuque and State of Iowa, have invented certain new and useful Improvements in Means for Operating Roller-Awnings; and I do hereby declare the following to be a full, clear, and exact description of the invention, which will enable others skilled in the art to which it appertains to make and use the same.

My invention may be considered in the class of appliances for operating roller-awnings; and one of the objects is to rigidly secure the axle of the sprocket-wheel to the end of the roller which carries the awning in such a manner that it will not become loosened by any jerks or harsh usage and will quickly respond to the slightest tension of the chain over the sprocket-wheel.

Another object is to provide a chain which shall be cheap of construction, exceedingly strong, shall not in any manner stretch or lengthen by use, and shall so adapt itself to the sprocket-wheel that there will be the minimum of friction.

Another object is to provide a sprocket-wheel which shall always maintain the chain in the position of its greatest usefulness with the least possible friction.

The manner in which I construct these means and accomplish these results will be fully set out and explained in the following specification when taken in connection with the accompanying drawings.

Figure 1 is a side view of the wheel with the chain in position on the wheel. Fig. 2 is a section through the wheel and the sprocket for holding the roller. Fig. 3 is a perspective of a portion of the chain. Fig. 4 is a perspective of a portion of the sprocket-wheel with the chain therein. Fig. 5 is a perspective of one of the members composing the links or one-half of a link. Fig. 6 is a modified form of one-half of a single link. Fig. 7 shows the modified form of a link made in one piece. Fig. 8 is a cross-section of the socket and end of the roller.

Like letters of reference denote corresponding parts in all of the drawings.

Referring to the drawings, A represents the socket, which is preferably cast in a cup shape with its sides slightly tapering from the base $a$ to the outer edge $b$. This cup or socket A is provided with a center piece or wedge B, which is preferably integral with the socket and projects out beyond the end of the socket for the purposes presently to appear. The roller C to be used with this socket is round and preferably made of two pieces slightly tapering, and one half is inserted in the socket on one side of said wedge B and the other on the other side of said wedge and held not only by the socket, but by a pin $d$, passing through the roller and wedge. By means of this mode of construction the roller C, which carries the awning, is prevented from turning in the socket A by the wedge B, and as the wedge is rigidly secured and is a part of the socket A and the sprocket-wheel D, hereinafter to be described, is also, with the shank E, a part of and integral with the socket when the wheel is turned it will revolve the socket, and with it the roller, as though all were one integral structure, and the roller will respond instantly to any movement of the wheel.

To the outer end of the shank E is secured a sprocket-wheel D. This sprocket-wheel is provided upon its outer edge with a series of sprockets G, a row on each edge of the periphery of the wheel, with a space between, and are preferably made of rectangular shape at the top and greatly increasing in size at the bottom. The space between the sprockets on each side is curved for the purposes presently to appear. Between the two rows of sprockets is a groove or space of just the width of the body of the chain. This space is made narrow for the purpose of preventing any wabbling motion of the chain when in use. The chain to be used in this sprocket-wheel is preferably constructed in duplicate parts or sections H. Each section is cast with a shoulder or eye I at one end and is provided with a transverse hole $e$ through the shoulder and a like hole $g$ through the opposite end of the section. Thus the entire links of the chain may be cast from a single pattern of one section and by the simplest and cheapest form of casting, or they may be stamped out, and in that case would require but one die. These sections H thus formed are united together by placing any two of the sections together, with their shoulders I projecting in opposite directions, then placing between said shoulders the opposite ends of another duplicate section and passing through the perforations or holes $g$ and $e$ a pin $h$, which is slightly riveted at each end just sufficient to prevent the separation of the sections, but not interfere with the free action of the ends of one section between the shoulders of the other sections.

The modified form of the link shown in Fig. 6 is similar; but instead of the shoulder being round it is slightly flattened on two opposite sides at $k$; but the operation, as will be seen hereinafter, is the same.

The other modified form of the link, as shown in Fig. 7, is made in a single piece instead of two duplicate pieces, with the shoulders L projecting from each side of the stem portion M and provided with the same transverse holes through the shoulders and through the opposite end. In this mode of construction all the links may be cast from a single pattern and united into a chain in the same manner as the links formed in duplicate, before described, are united.

It will be observed that in the use of a chain constructed in the manner I have described there will be the minimum of friction, as when the chain is passing around the sprocket-wheel the shoulders I, being curved, will be brought into engagement with the sprockets on a curve and instead of sliding down the edge of the sprockets, causing great friction, they will pass down the edges on a roll or turn, which will avoid the friction. It will also be seen that the groove in the sprocket-wheel, being of substantially the same width as the thickness of the body of the links, will maintain the chain in the position of its greatest usefulness and strength with the least possible friction.

Having now described my invention, what I claim is—

1. In a device of the character described, a chain consisting of links, the links each formed of duplicate members, each member provided with an integral shoulder projecting outwardly from the main body of the member, the members forming the link so placed with relation to each other that the shoulders carried by each member are oppositely located, perforations in the ends of the link, and a pin adapted to unite the links together.

2. In a device of the character described, a chain consisting of links of uniform size, each link composed of duplicate parts, each part provided with a shoulder projecting from one side near one end in such a manner that when the two parts are united together both shoulders will project outwardly near one end of each link, perforations through the shoulders and through the opposite ends of each part, and a pin for uniting the opposite ends of one link between the shoulders of another link, whereby when the chain is complete the shoulders of each link will provide a curved bearing on the sprockets with which it is to be used.

3. In a device of the character described, a chain consisting of links, the links each formed of duplicate members, each member provided with a shoulder projecting outwardly from the main body of the member, the members forming the link so placed with relation to each other that the shoulders carried by each member are oppositely located to provide a space therebetween in which the end of another link engages, a pin to fasten the links together, and a sprocket-wheel having two rows of sprockets on opposite sides of the periphery of the wheel and a groove between the rows of sprockets in which the body of the chain travels.

4. In a device of the class described, the combination with a sprocket-wheel having sprockets on opposite edges of its periphery and a groove between the sprockets, of a chain consisting of links, each link composed of a flat body portion adapted to travel edgewise in the groove of the sprockets and integral shoulders projecting from opposite sides at one end of the body portion to form a space therebetween to receive the opposite end of the adjoining link, said shoulders adapted to engage the space between the sprockets, and a pin to fasten the links together.

5. In a device of the class described, the combination with a sprocket-wheel having a series of sprockets on opposite edges of its periphery each of which are provided with curved edges and a groove between the sprockets, of a chain consisting of links, the links each formed of duplicate members, each member comprising a flat body portion and an integral shoulder projecting outwardly at one end of the flat body portion of the member, the members forming the link so placed with relation to each other that the shoulders carried by each member are oppositely located to provide a space therebetween to receive the opposite ends of the adjoining members, the said flat body portions adapted to travel in the groove of the wheel and the shoulders adapted to engage the curved edges of the sprockets, and means to fasten the links together.

In testimony whereof I have hereunto signed my name in the presence of two witnesses.

ALFRED L. CLARK.

Witnesses:
M. M. CADY,
H. BOYCE.